Sept. 24, 1957 G. M. BONEBRAKE 2,807,390
APPARATUS FOR REMOVING SLABS FROM A STACK AND
CONVERTING THE SLABS TO SMALLER PIECES
Filed Feb. 8, 1952 9 Sheets-Sheet 1

INVENTOR.
Gay M. Bonebrake
BY
Attorney

Sept. 24, 1957  G. M. BONEBRAKE  2,807,390
APPARATUS FOR REMOVING SLABS FROM A STACK AND
CONVERTING THE SLABS TO SMALLER PIECES
Filed Feb. 8, 1952  9 Sheets-Sheet 3
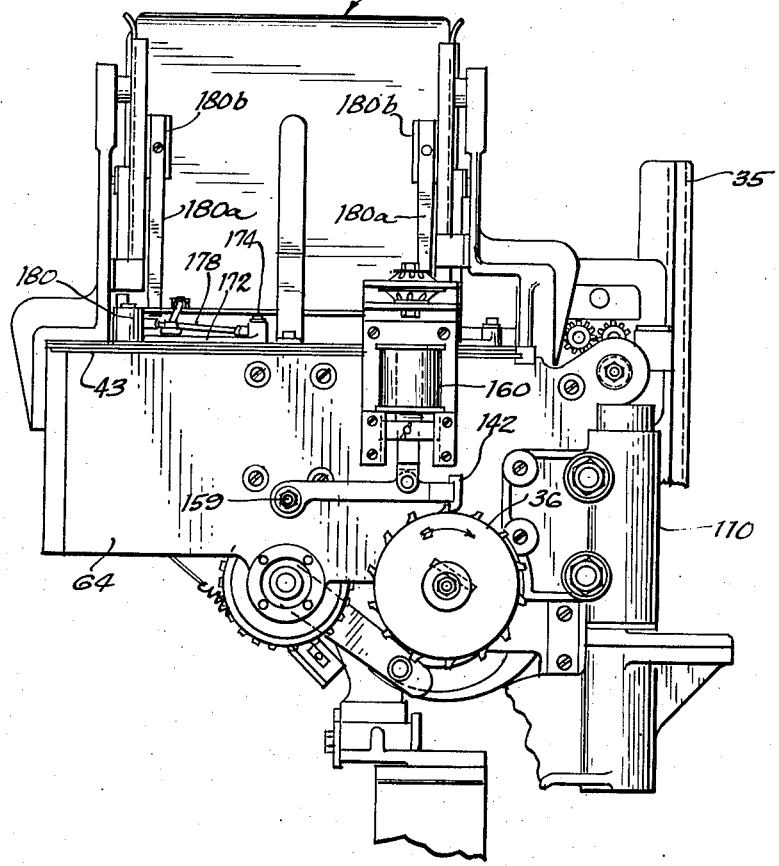
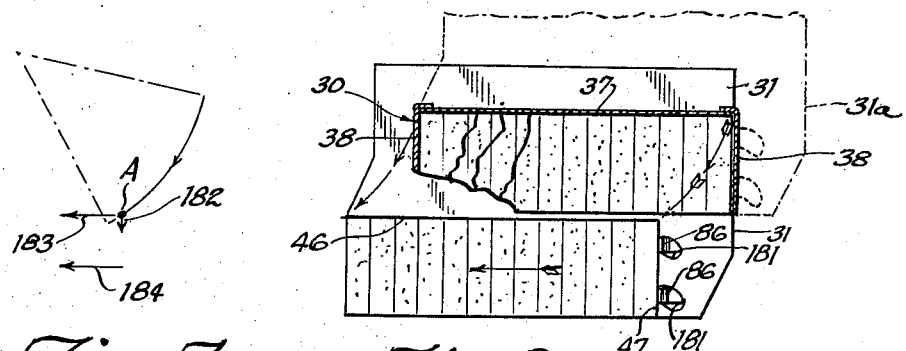
INVENTOR.
Gay M. Bonebrake
BY
Attorney Sept. 24, 1957 G. M. BONEBRAKE 2,807,390
APPARATUS FOR REMOVING SLABS FROM A STACK AND
CONVERTING THE SLABS TO SMALLER PIECES
Filed Feb. 8, 1952 9 Sheets-Sheet 4

Fig. 8

INVENTOR.
Gay M. Bonebrake
BY
Attorney

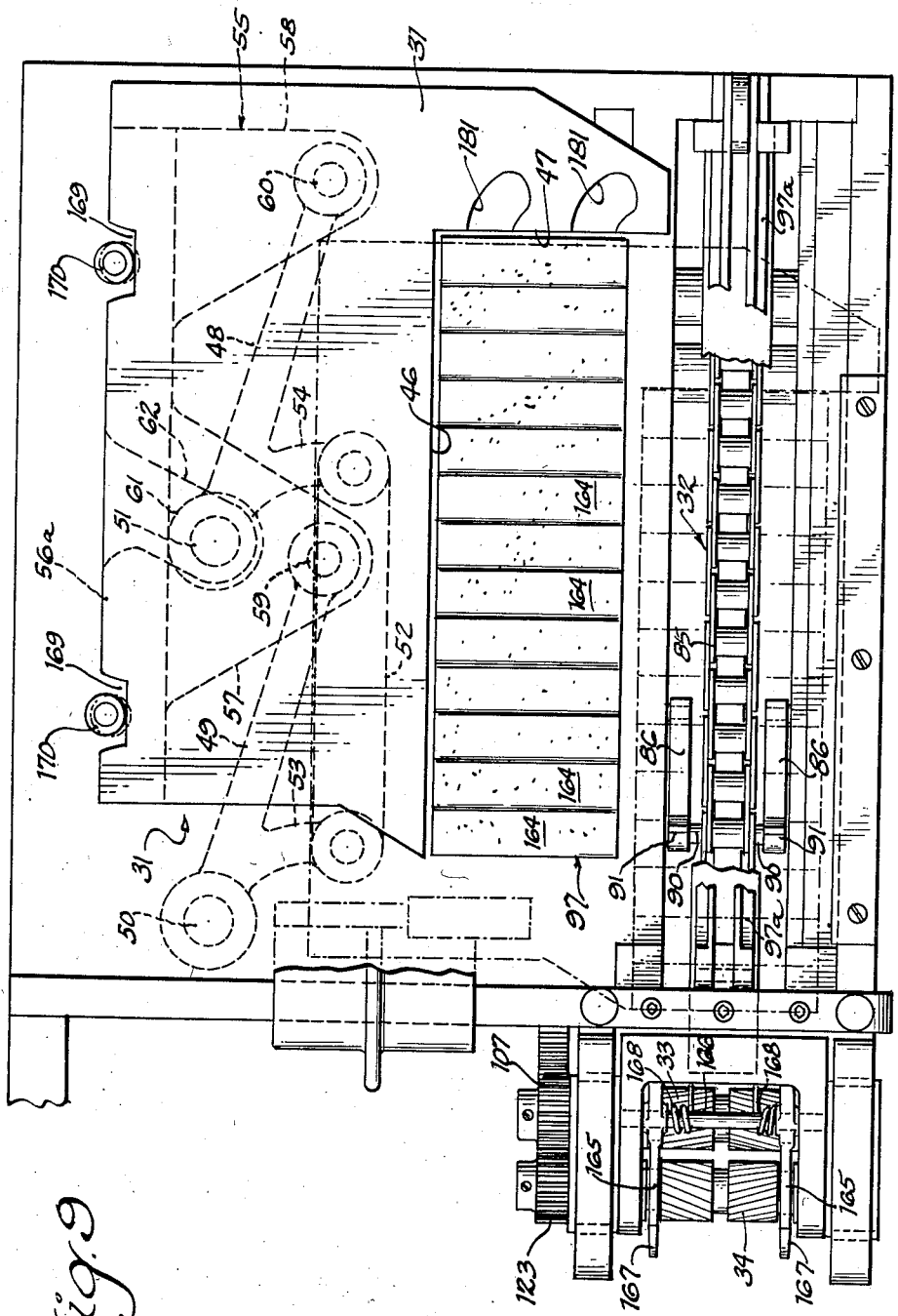

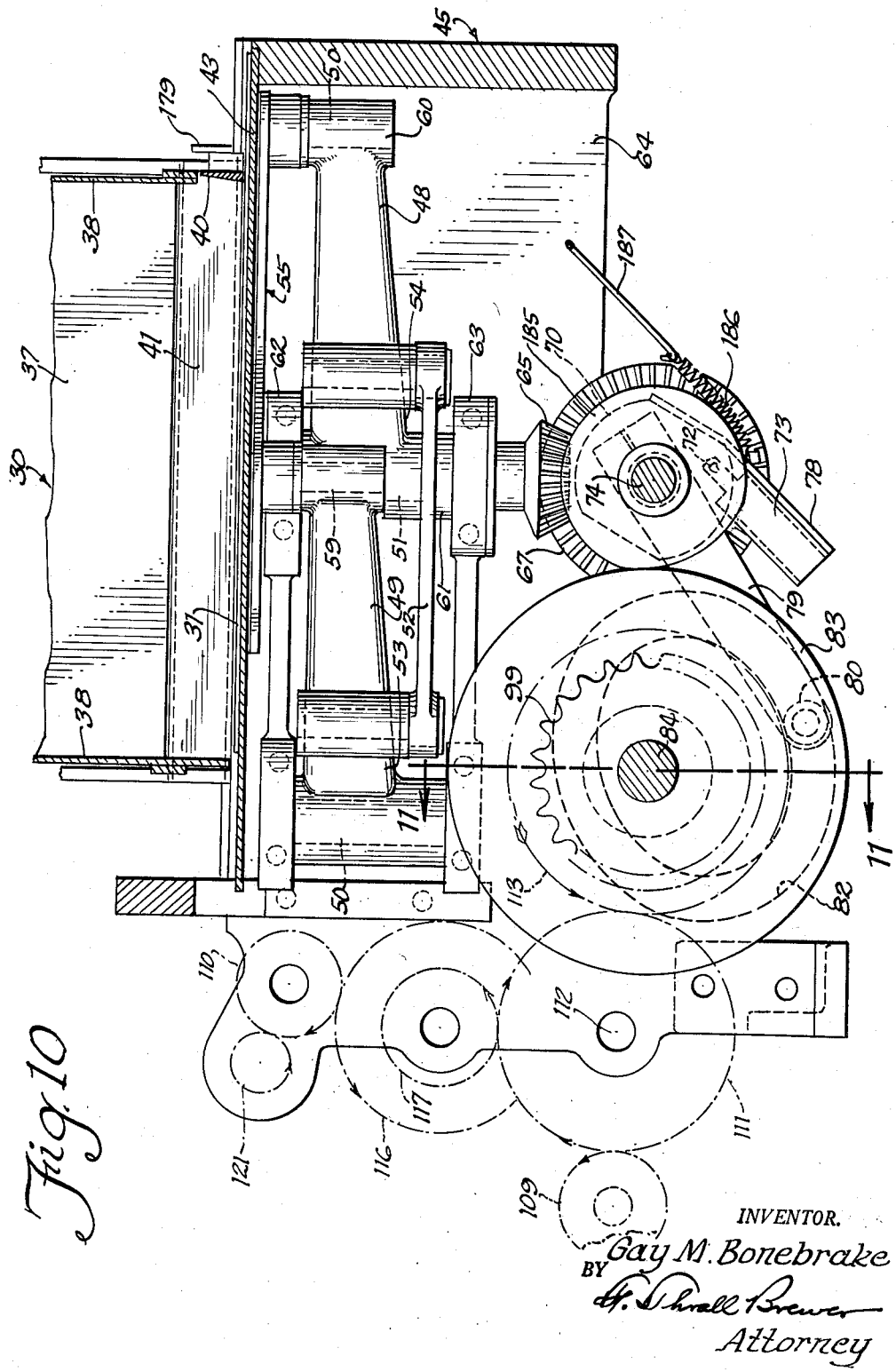

Sept. 24, 1957 G. M. BONEBRAKE 2,807,390
APPARATUS FOR REMOVING SLABS FROM A STACK AND
CONVERTING THE SLABS TO SMALLER PIECES
Filed Feb. 8, 1952 9 Sheets-Sheet 7
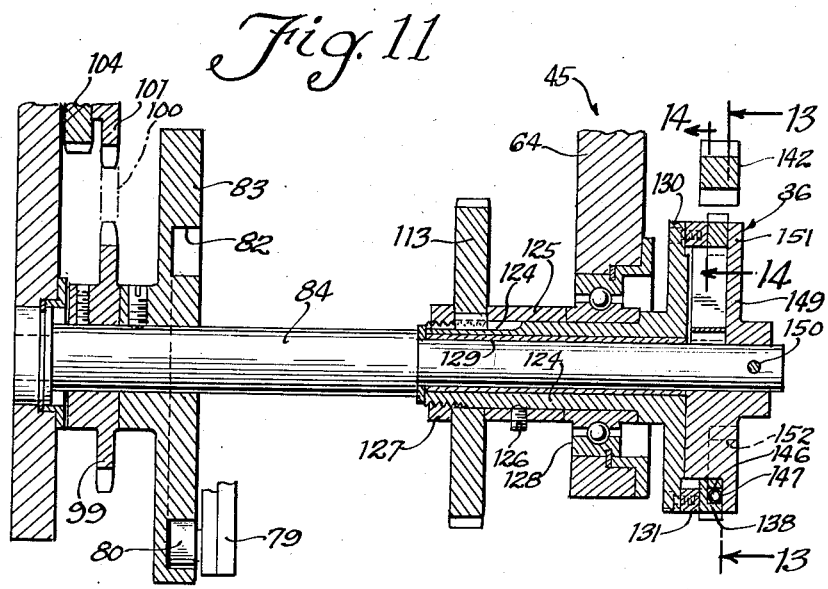
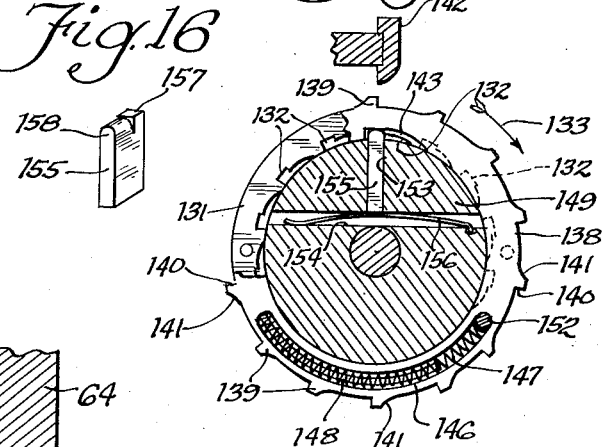
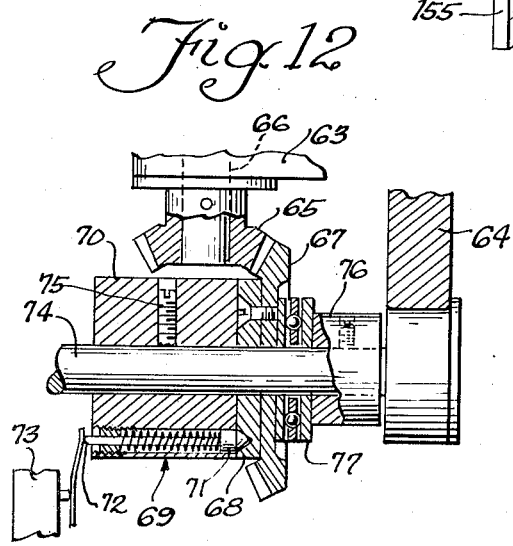
INVENTOR.
Gay M. Bonebrake
BY
H. Thrall Brewer
Attorney Sept. 24, 1957   G. M. BONEBRAKE   2,807,390
APPARATUS FOR REMOVING SLABS FROM A STACK AND
CONVERTING THE SLABS TO SMALLER PIECES
Filed Feb. 8, 1952   9 Sheets-Sheet 8
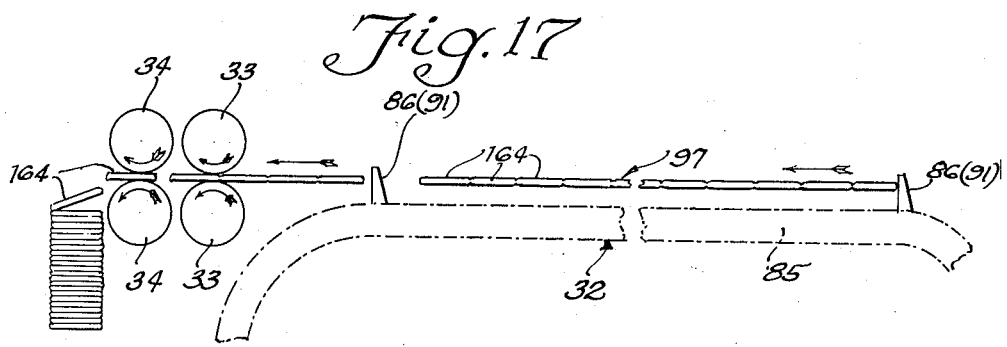
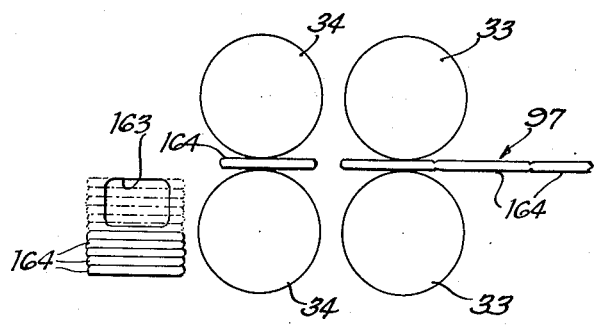
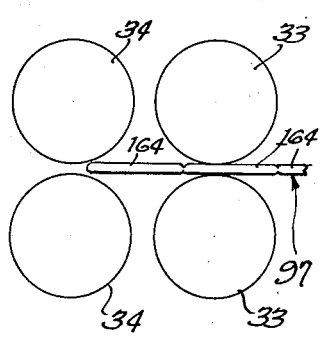
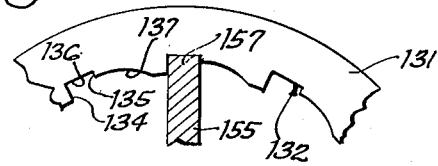
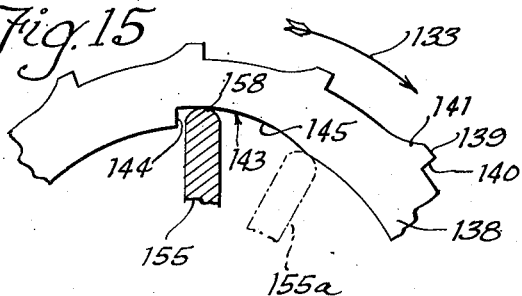
INVENTOR.
Gay M. Bonebrake
BY
*H. Shrell Brewer*
Attorney

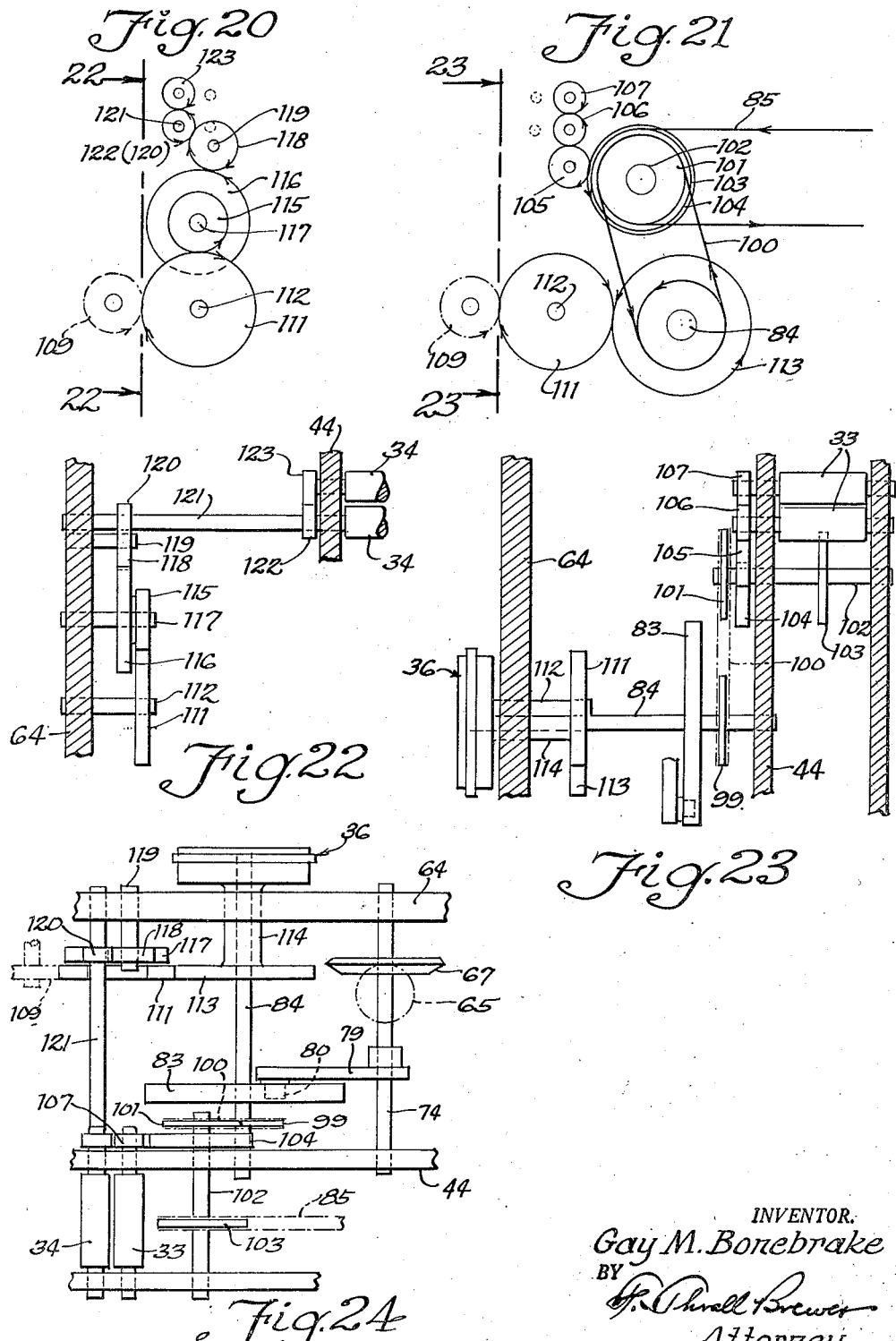

United States Patent Office 2,807,390
Patented Sept. 24, 1957

2,807,390

APPARATUS FOR REMOVING SLABS FROM A STACK AND CONVERTING THE SLABS TO SMALLER PIECES

Gay M. Bonebrake, Chicago, Ill., assignor to Wm. Wrigley, Jr., Company, Chicago, Ill., a corporation of Delaware Application February 8, 1952, Serial No. 270,636

6 Claims. (Cl. 221—236)

My invention relates to a mechanism for handling of slabs of material, and more specifically, to apparatus for feeding such slabs from a stack and converting them to smaller pieces.

A general object of my invention is to provide an improved feeder for moving slabs of material from a hopper to a device which divides the slabs into smaller pieces.

A further object of this invention is the provision of a mechanism embodying an arrangement of apparatus for effecting and controlling the flow of slabs of material to and through a device that converts them to smaller pieces. This control, in the present instance, is responsive to the level of a stack of such pieces from which the pieces are withdrawn for further operations such as wrapping and packaging.

As another object, my invention provides, in conjunction with a device for taking pieces of material from a stack and processing them, for intermittent operation of a feeder for slabs of the material and a breaker for converting them to the aforesaid pieces and delivering them to the stack, whereby the level of the pieces in the stack may be kept within certain limits and the pieces delivered to the stack without being damaged. The intermittent operation of the feeder in the disclosed mechanism is effected by a clutch of unique design that also constitutes a feature of my invention.

My invention has for a further object the provision of a mechanism for receiving slabs of material and converting them to smaller pieces in such a way that the apparatus may be intermittently operated without damage to the slabs or pieces.

This invention also has within its purview the provision of a mechanism including a hopper for holding material in slab form and means for transferring slabs from the bottom of the hopper to an adjacent linearly moving conveyor in timed relationship to the movements of the conveyor.

I have also provided a mechanism for feeding slabs of material from a hopper to a linearly moving conveyor from one side of the conveyor and in such a way that the slabs are in closely spaced relationship on the conveyor.

Other objects and advantages of the invention will be apparent from the following description and the accompanying drawings in which similar characters of reference indicate similar parts throughout the several views.

In the nine sheets of drawings:

Fig. 5 is a rear elevational view of the mechanism shown in Figs. 1 and 3;

Fig. 6 is a diagrammatic plan view, partly in section, and illustrating the feeding operation and showing parts in positions different from those of Fig. 2;

Fig. 7 is a diagrammatic view illustrating the velocities imparted to a slab of material as it is fed in the manner shown in Fig. 6;

Fig. 8 is a vertical sectional view taken substantially on a line 8—8 of Fig. 3 and in the direction of the arrows;

Fig. 9 is a horizontal sectional view taken substantially on a line 9—9 of Fig. 8 and in the direction of the arrows;

Fig. 10 is a vertical sectional view taken substantially on a line 10—10 of Fig. 8 and in the direction of the arrows;

Fig. 11 is a vertical sectional view taken substantially on a line 11—11 of Fig. 10, in the direction of the arrows, and illustrating driving parts of the disclosed mechanism including a clutch through which intermittent operations of certain elements are effected;

Fig. 12 is a sectional view, partially in elevation, showing a portion of the driving parts additional to those illustrated in Fig. 11, and shown in Fig. 10, which additional driving parts include overload release clutch and an element for effecting unidirectional rotation;

Fig. 13 is a sectional view wherein the section is taken substantially on a line 13—13 of Fig. 11 in the direction indicated by the arrows;

Fig. 14 is an enlarged sectional view taken substantially on a line 14—14 of Fig. 11 and showing only portions of certain parts which are included in Fig. 13;

Fig. 15 is an enlarged sectional view taken substantially on the line 13—13 of Fig. 11 and showing only portions of certain parts which are included in Fig. 13 and are different from those of Fig. 14;

Fig. 16 is a perspective view of a part of the structure shown in Figs. 11, 13, 14 and 15;

Fig. 17 is a diagrammatic elevational view showing the passage of scored slabs of material through parts of the illustrated mechanism;

Fig. 18 is a diagrammatic elevational view showing a preferred position of a slab of material in respect to certain parts of my mechanism at the time the mechanism is stopped during its intermittent operation;

Fig. 19 is a similar diagrammatic view showing an unseparated portion of a slab at one stage of the operation of the mechanism;

Fig. 20 is a vertical diagrammatic view taken in a direction toward the bottom of the lower left hand portion of Fig. 9, and illustrates the drive for one part of the slab severing mechanism;

Fig. 21 is a diagrammatic view similar to Fig. 20, but illustrating the drive for another part of the slab feeding and serving mechanism;

Fig. 22 is a view partially in elevation and partially in section taken substantially along a line 22—22 in Fig. 20 and in the direction of the arrows;

Fig. 23 is a view partially in elevation and partially in section taken substantially along a line 23—23 of Fig. 21, and in the direction of the arrows; and Fig. 24 is a top plan view showing the driving parts of Figs. 20 to 23.

Figure 1:
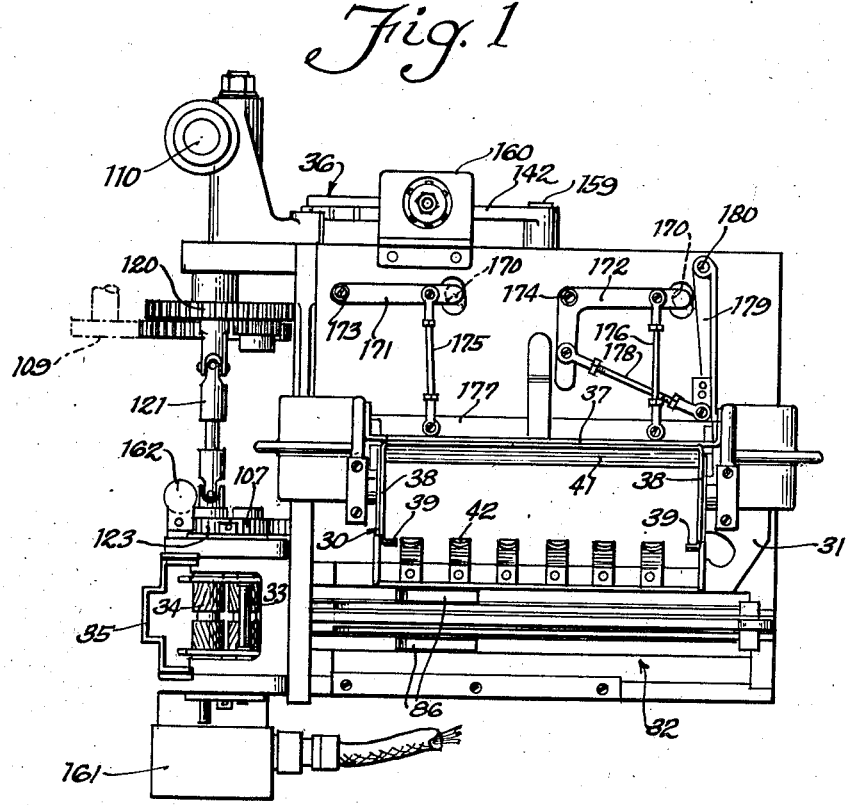
Fig. 1 is a top plan view of mechanism embodying a preferred form of my invention.

In its general aspects the apparatus of the present invention is adapted to receive slabs or sheets of material, such as chewing gum, to break or divide the slab into sticks, and to deliver the sticks to a stack from which they may be continuously withdrawn for further operations such as wrapping. To effect these required results, I have developed the mechanism disclosed in the accompanying drawing, which constitutes an exemplary and illustrative embodiment of my invention. In the disclosed mechanism, I have provided hopper 30 in which the slabs or sheets are stacked, a swinging ram 31 which reciprocates to eject the bottom slab from the hopper 30 at each cycle of movement, a pusher conveyor 32 which receives the ejected slabs from the ram 31, slow rolls 33 into which the slab is pushed by the pusher conveyor 32, fast rolls 34 which cooperate with the slow rolls 33 to break the slab into sticks, and a chute 35 in which the sticks are stacked as they leave the fast rolls 34.

In order to maintain a supply of severed sticks, and so that the sticks may not be damaged or jammed in the chute 35 as they are delivered by the fast rolls 34 to the chute 35, the stick level in the chute 35 is held within certain predetermined limits. This is accomplished by preselecting an operating speed for the disclosed breaking mechanism which supplies sticks to the chute somewhat faster than they are withdrawn therefrom and intermittently driving the ejecting ram 31, the pusher conveyor 32 and the slow rolls 33 through a clutch 36 (Figs. 5, 11 and 13) which is engaged or disengaged depending upon the gum level in the chute 35. The clutch 36 is so constructed and arranged that it effects very abrupt starting and stopping action of the mechanism and can be engaged and disengaged only at certain predetermined positions of the slab with respect to the slow and fast rolls 33, 34, whereby the slab will not be damaged by a chewing action of the rolls.

As shown in Figs. 1 and 8, the hopper 30 extends vertically and has a hollow U-shape through a major portion of its length when considered in horizontal section. The base of the U comprises a relatively long side wall 37, and the legs of the U form relatively short end walls 38 for the hopper. At the region below the middle of the hopper length, the ends 38 have inwardly directed flanges 39 which help to retain the slabs or sheets in the hopper 30. The flanges 39 terminate an appreciable distance from the hopper bottom, and the hopper end wall 38, as shown in Fig. 8, which is the hopper end wall at the left side in Fig. 1, extends at an angle to the remainder thereof while remaining in the same plane. The other hopper end wall 38, which is the one at the right in Fig. 10, is similarly shaped but the angled bottom portion is somewhat shorter and terminates a little higher to provide room for a movable end member 40 having a slightly inclined inner surface. The hopper side wall 37 ends a somewhat greater distance from the hopper bottom, and below the side there is an inclined movable side member 41. At the side of the hopper 30 opposite the inclined movable side member 41, there are spaced inclined fingers 42 below the region where the flanges 39 on the hopper end walls 38 terminate. Below the hopper bottom there is a base plate 43, as shown in Figs. 5, 8 and 10, which is secured to a wall 44 of a framework 45 which houses and supports various driving parts employed in my disclosed mechanism.

In a space between the base plate 43 and the bottom of the hopper, the ejecting ram 31 is positioned so as to slide on the upper surface of the base plate. As shown in Fig. 9, the ram 31 is a plate that may be considered as being of generally rectangular shape with a portion removed from one corner to form a recess having a long side 46 and a short side 47 extending at right angles to one another. As shown in Fig. 6, the ram 31 is adapted to have a swinging movement from the dash-dot position, indicated at 31a, to the full-line position in ejecting the bottom slab from the hopper 30. The ram 31 is moved by swinging parallel arms 48 and 49, shown in Figs. 9 and 10. These arms are pivoted on the framework 45 at 50 and 51 and are interconnected by a movable link 52 connected to branches 53 and 54 on the arms. The arms are tied to the ram plate 31 by an intermediate member 55 which has thick portions 56 and 56a through which the member 55 is secured to the under side of the ram plate 31. The member 55 also has thin portions 57 and 58, which are spaced from the bottom of the ram plate 31, as shown in Fig. 8, so as to pass beneath the base plate 43 when the ram 31 and the member 55 are moved to the left from the position of Fig. 8. The portions 57 and 58 taper in width, as shown in Fig. 9. The arms 48 and 49 are pivotally connected to the portions 57 and 58 at 59 and 60, as depicted in Figs. 9 and 10.

The arm 48 has at the pivot 51 a relatively long hub 61 which supports the arm between two brackets 62 and 63 secured to a plate 64 of the framework 45. A bevel gear 65 (Figs. 8, 10 and 12) below the lower bracket 63 is drivingly secured to the hub 61 by a shaft 66 which projects through the bracket 63. The gear 65 meshes with a bevel gear 67, which, as shown in Fig. 12, is secured to a ring 68. This ring forms part of an overload release clutch 69, which also includes a collar 70, and a spring-urged detent 71 carried by the collar 70 and releasably engaged with recesses in the ring 68. A rod 72 projecting externally of the collar 70 is engageable with an actuating element of a switch 73 which controls a driving motor (not shown) for the entire mechanism, whereby if undue resistance is offered to the movement of the ram plate 31 as it ejects a slab of material from the hopper, as might occur if a gum slab should stick, the clutch 69 is disengaged to stop the driving force of the ram plate 31, and the rod 72 opens the switch 73 to stop the driving motor. The collar 70 is secured to a shaft 74 by a set screw 75. A thrust collar 76 prevents movement of the ring 68 away from the collar 70 and thus assures that the rod 72 will move against the switch 73 to open it. A thrust bearing 77 is positioned between the gear 67 and the thrust collar 76. As shown in Fig. 8, the ends of the shaft 74 are mounted in the walls 44 and 64 of the framework 45, and the switch 73 is supported on the clutch collar 70 by an arm 78.

As shown in Figs. 10 and 11, the shaft 74 has secured thereto an arm 79 which carries a follower 80 which rides in a generally elliptical cam groove 82 in a cam 83 to effect oscillatory movement of the shaft 74 and bevel gear 67. The cam is secured to a shaft 84 which is connected with the driven portion of the clutch 36, which clutch was previously described as responsive in operation to the level of sticks in the chute 35.

Figure 4:
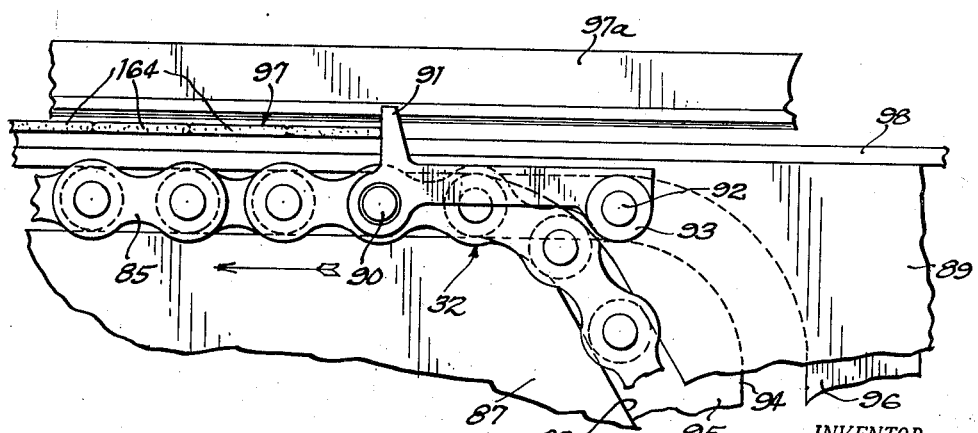
Fig. 4 is a fragmentary elevational view illustrating the structure of a conveyor by which sheet or slab material is moved linearly in the disclosed mechanism.

As depicted in Figs. 4, 8 and 9, the pusher conveyor 32, which moves slabs linearly away from the hopper 30, includes a chain loop 85 and pusher elements 86 carried by the chain loop. The chain loop is mounted on and extends completely around a plate 87 supported from the framework 45. The chain loop rides in a slot 88 formed by the plate 87 and another plate 89 extending around it. There are three pairs of pusher elements 86 equally spaced from one another along the developed length of the chain loop. The pusher elements 86 of a pair lie directly opposite one another, on opposite sides of the chain loop 85, and are carried relative to the chain at their front ends, in respect to the normal direction of movement of the chain, by pins 90 projecting from the sides of the chain loop. The pusher elements 86 also have upstanding pusher projections 91 adapted to engage and push a slab of material, as indicated in Fig. 4. The rear ends of the pusher elements 86 have laterally projecting pins 92 which carry rollers 93 that ride in slots 94 formed between inner plates 95 and outer plates 96 surrounding inner plates at the opposite sides of the plates 87 and 89. The slots 94 are longitudinally offset from the groove 88 so as to guide the pusher elements 86 in a manner to keep the pusher projection 91 upright during the travel of the chain in its path of movement. The front faces of the pusher projections 91 of one pair of elements 86 are displaced along the chain loop from the front faces on the next pair of elements by a distance equal to the length of a slab or sheet that is to be separated into sticks plus the width of one stick. It is contemplated that my disclosed apparatus will accommodate slabs of a length to provide 13 sticks of gum, and in this event the mentioned distance between pusher elements is equivalent to 14 sticks. As shown in Fig. 4, a scored slab 97 is being pushed along and is kept from buckling upwards by a hold-down bar 97a which is somewhat spaced from the slab when it lies flat in contact with a strip 98 mounted on the edge of the plate 88. As shown in Figs. 8, 11, and 24, the pusher conveyor 32 is driven from the driven portion of the clutch 36 through the shaft 84, a sprocket 99 on the shaft 84, a chain 100 meshing with the sprocket 99, a sprocket 101 engaged by the chain 100, a shaft 102 on which the sprocket 101 is mounted, and a sprocket 103 which is secured to the shaft 102 and meshes with the chain loop 85 at one end of the loop.

As shown in Figs. 21, 23 and 24, the slow rolls 33 are driven from a gear 104 secured to the shaft 102 and thus are driven from the driven side of the clutch 36. The gear 104 meshes with a gear 105 which meshes in turn with a gear 106 secured to the lower slow roll. The gear 107 meshes with a gear 108 secured to the upper slow roll.

Before the clutch 36 is described as to details and manner of operation, it is considered desirable to explain how driving force is applied to the driving side of the clutch, from which the force is transmitted to the ejecting ram 31, the pusher conveyor 32, and the slow rolls 33. As a further consideration, it is noteworthy that the fast rolls 34 are driven independently of the clutch 36.

Attention is first directed to Figs. 21, 23 and 24 for consideration of the application of driving force to the driving portion of the clutch 36. A gear 109 is driven by the main driving motor (not shown), which motor is controlled by the switch 73 (Fig. 12). The gear 109 is indicated in dash-dot lines, because it is not mounted on the framework 45, and because it remains stationary when the framework and the mechanism carried thereby are swung to an inoperative and exposed position relative to the framework's vertical pivot 110 (Fig. 1). The gear 109 meshes with a gear 111 mounted on a shaft 112. The gear 111 meshes with a gear 113 keyed to a sleeve 114. This sleeve is directly connected to the driving portion of the clutch 36 and is journalled for rotation on the shaft 84 which was previously described as connected with the driven portion of the clutch 36.

Attention is now directed to Figs. 20, 22 and 24, for the drive of the fast rolls 34. Gear 111 meshes with gear 115 which has a driving connection to gear 116, both gears being secured to a shaft 117. Gear 116 meshes with a gear 118 on a shaft 119. Gear 118 also meshes with a gear 120 which is secured to a shaft 121 which, in turn, is secured to the lower fast roll 34. A gear 122 is secured to the shaft 121 and meshes with a gear 123 which has a driving connection to the upper fast roll 34.

Reference is now made particularly to Figs. 11 and 13 to 16 for a more detailed description of the clutch 36. Sleeve 114, to which the gear 113 is secured, as by a key at 124, forms part of the driving side of the clutch 36. A collar 125 embraces the sleeve 114 and is secured thereto by a set screw 126, as shown in Fig. 11. A nut 127 threaded onto the end of the sleeve 114 maintains the gear 113 on the sleeve 114 against the end of the collar 125. The end of the collar 125 opposite the gear 113 abuts the inner race of an anti-friction bearing 128, the outer race of which bearing is mounted in the wall 64 of the framework 45. Between the sleeve 114 and the shaft 84 is a sleeve bearing 129 which permits relative rotation between these parts. The sleeve 114 extends through the wall 64 and has at the end outside this wall, which end is opposite the end to which gear 113 is secured, a flange 130 to which a driving ring 131 is secured.

As shown in Figs. 13 and 14, the ring 131 has a plurality of recesses 132 equally spaced about its inner periphery. When the driving ring 131 is viewed from the side required for the normal direction of driving to be clockwise, and as is the case in Figs. 13 and 14 where the normal direction of rotation in operation is illustrated by an arrow 133, the left side of each recess 132 is radial as indicated at 134, and the right side of the recess is radial as indicated at 135 for a short distance from the bottom 136 of the recess and thence smoothly curved and inclined to the radial in a clockwise direction as indicated at 137.

Adjacent the driving ring 131 is a control ring 138, which, as shown in Figs. 13 and 15, has a plurality of lugs 139 equally spaced about the outer periphery. The number of lugs 139 is 14 in the embodiment illustrated, which number corresponds to the spacing in scored gum sticks between corresponding portions of adjacent pairs of pusher elements 86, or is one more than the number of sticks in a slab dispensed from the hopper 30. When viewed in respect to clockwise driving as indicated by the arrow 133 in Figs. 13 and 15, the right or forward side of each lug 139 is radial, as indicated at 140, and the left or rear side is inclined to the radial as indicated at 141. The radial side 139 of each lug is adapted to be engaged by a detent 142, whereby the control ring 138 is abruptly stopped and held against clockwise rotation. The inner periphery of the control ring 138 has a notch 143, which is radial on the left or rear side as indicated at 144 when the control ring is viewed, as in Figs. 13 and 15, from the side required for the intended direction of driving rotation to be clockwise, as indicated by the arrow 133, and is curved and inclined as indicated at 145 on the right or forward side. The control ring 138 has, on the side away from the driving ring 131, an arcuate slot 146 which contains a coil spring 147, as shown in Figs. 11 and 13. A curved stem 148 is secured to one end of the slot 146 and extends therealong and within the greater portion of the length of the coil spring 147.

A driven member 149 of the clutch 36 is secured to the shaft 84 by a fastening element 150. The driven member extends within the control ring 138 and the driving ring 131 and abuts the flange 130 on the sleeve 124. A flange 151 on the driven member 149 holds the control ring 138 against the driving ring 131. A projection 152 on the flange 151 extends into the arcuate slot 146 so as to engage one end of the coil spring 147. Movement of the driven member 149 in the driving direction with respect to the control ring is limited by engagement of the projection 152 with the stem 148. Such movement has an angular value about equal to the spacing between adjacent lugs 139. The spring 147 yieldingly resists such relative movement. The driven member 149 has therein a radial slot 153 and another slot 154 which is perpendicular to the slot 153 and crosses it at its inner end, so that the radial slot 153 opens into the mid-portion of the slot 154. A block 155 is mounted for sliding movement in the radial slot 153 and is urged outwardly into the recesses 132 and the notch 145 by a leaf spring 156 in the slot 154. As depicted in Fig. 16, a portion 157 of the outer end of the block 155, which is engageable with any of the recesses 132, has square corners, and a portion 158 of the outer end, which is engageable with the notch 145, is rounded.

Figure 3:
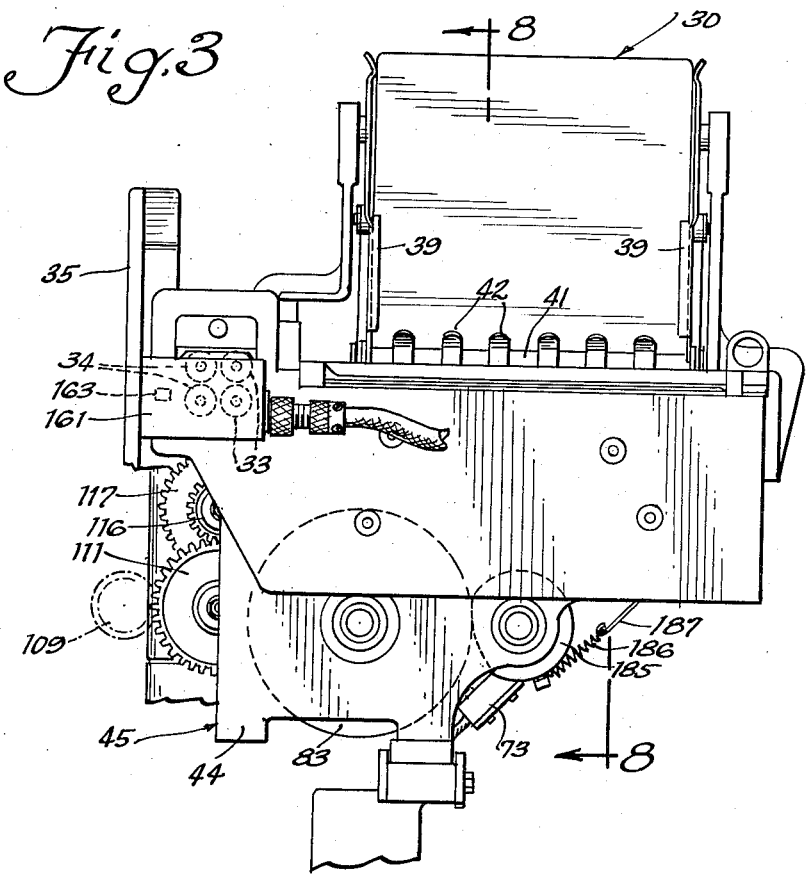
Fig. 3 is a front elevational view of the mechanism shown in Fig. 1.

As shown in Figs. 1 and 5, the detent 142, which is adapted to engage any of the lugs 139 abruptly to stop the control ring 138 of the clutch, is pivoted on a stud 159 projecting from the wall 64 of the framework 45 and is operated by a solenoid 160 which is controlled by a photoelectric cell 161 (Figs. 1 and 3) which receives light from a source 162 through windows 163 in the sides of the chute 35. The arrangement is such that when the level of sticks 164 in the chute 35 is high enough to block substantially completely the windows 163, as illustrated in Fig. 18, the solenoid 160 causes the detent 142 to be lowered to its holding position of Fig. 5 in which it engages a lug 139 and prevents movement of the control ring 138 in the driving direction, and when the level of gum sticks 164 in the chute 35 has dropped sufficiently to uncover the windows 163 completely or almost completely, the solenoid 160 causes the detent 142 to be raised to its clutch releasing position of Fig. 13, in which the control ring 138 is free to rotate with the driving ring 131.

When the detent 142 is in a raised position, so as to release the clutch for driving operation, the portion 157 of the block 155 engages in one of the recesses 132, as shown in Fig. 14, and driving force is transmitted through the clutch from between the driving ring 131 through the block 155 and thence to the driven member 149. While thus transmitting driving force, the side 134 of the recess 132 is engaged with, and presses against the block 155. On the other hand, when the detent 142 moves down into engagement with one of the lugs 139 on the control ring 138, the block 155 moves with the driving ring 131 and is cammed downwardly by the inclined region 145 of the notch 143 against the force of the spring 156 to a position indicated in dash-dot lines at 155a in Fig. 15. As the block moves to this position, it moves radially inwards in the slot 153 in the driven member 149. Thus, the block 155 is moved radially inwardly an amount sufficient for the square-end portion 157 to be out of engagement with any of the recesses 132 and clear of the inner periphery of the driving ring 131, since it is contemplated that the inner radius of the driving ring is somewhat greater than that of the control ring 138. Since the block 155 no longer engages any recess 132 in the driving ring 131, the driven member 149 is no longer driven, and its rotation in the normal direction of movement is limited to a very small amount by contact of the projection 152 on the driven member with the stem 148 on the control ring 138, which is held stationary by the detent 142.

When the detent 142 is returned to its position for releasing the clutch, for driving operation of the mechanism, as depicted in Fig. 13, the control ring 138 moves in the direction of normal driving rotation under the action of the coil spring 147, and this involves return of the block 155 from the dash-dot position at 155a to the full-line position of Fig. 15, with concomitant outward movement of the block radially of the driven member by virtue of the biasing force of the spring 156 and the region 145 of the notch 143. Since the corner of the portion 157 of the block extends radially outward beyond the adjacent region of the portion 158 on that block, and the inclined region 137 of the recess 132 is radially inward of the inclined region 145 of the notch 143, contact is established between the portion of the block 155 and the inclined region 137 of recess 132 as the block moves outward to the full-line position of Figs. 14 and 15. This drive is reestablished between the driving ring 131 and the driven member 149 through the block 155.

When the detent 142 moves down to the control ring 138, the latter is stopped only when it reaches any one of a certain number of angular positions, 14 in the present embodiment, in which the radial face 140 of a lug 139 reaches the straight face on the detent 142. The driving mechanism between the clutch 36 and the pusher conveyor is so designed and proportioned that each pair of pusher elements 86 will move a distance equalling the spacing between forward faces of the upstanding projections 91 of adjacent pairs of pusher elements 86 for each revolution of the clutch. This spacing is equal to the width of 14 gum sticks or that of one stick more than is actually present in a slab of the normal size for which the mechanism is built. Thus the pusher conveyor 32 moves an amount equal to the width of one stick with rotation of the clutch 36 an amount equalling the angular spacing between the radial faces 140 of adjacent lugs 139. It is contemplated that slow rolls 33 will feed a slab 97 slightly faster than the elements 86 push the slab as indicated in Fig. 17 by the spacing of the rear end of the slab being fed by the slow rolls 33 from the adjacent pair of pusher elements 86, whereby the slab cannot buckle between the slow rolls 33 and the pusher elements. If the difference between the speed of the slow rolls and that of the pusher elements 86 is disregarded, then each stick 164 will occupy the same position in the slow feed rolls whenever they are stopped by stopping of the driven member 149 of the clutch 36 through stoppage of the control ring 138 by engagement of any of the lugs 139 with the detent 142. This position is illustrated in Fig. 18, and may be observed to be one in which the next-to-be-severed stick 164 has about two thirds of its width through the slow rolls 33. Actually the amount of the unsevered stick that has passed through the slow rolls will increase slightly from one stick to the next, but in any event it must be sufficient for the fast rolls 34 to have obtained a sufficient grip on the preceding stick to accomplish a breaking or severing operation. If, on the other hand, the stopping of the slow rolls 33 occurs in some such relative position of the slab with respect to the fast and slow rolls that there is no stick gripped between the fast rolls, as shown in Fig. 19, the fast rolls may engage the unsevered stick enough to damage its edge by chewing it up without accomplishing the severing.

It would be sufficient to prevent this damage if the slow rolls 33 were stopped at positions spaced by some multiple of the width of one gum stick rather than a single gum stick. Likewise, driving engagement through the clutch 36 could be satisfactorily reestablished if the driving ring 131 were provided with only a single recess 132 engageable by the block 155 rather than a large number of these recesses, which in the embodiment shown, happens to be 14.

Practical considerations, such as the requirement for satisfactory stacking of the gum sticks in the chute 35, dictate that the clutch 36 should be enabled to stop the slow rolls 33 within an angular movement of the clutch corresponding to no more than the width of one stick after the detent 142 moves down to the control ring 138, and that the driving connection through the clutch should be reestablished after only a small angular movement of the driving ring 131 by the provision of a large number of recesses 132 with which the block 155 may engage, which number may be other than 14 (the number of the lugs 139 on the control ring 138).

As shown in Fig. 9, fingers 165 are pivotally mounted upon a shaft 166 over the slow rolls 33 and extend downwardly into grooves in the upper fast roll at the top thereof and on the side thereof away from the slow rolls 33 and terminate in upwardly curved end portions 167. The fingers 165 are yieldingly urged downwardly into this position by springs 168 on the shaft 166. Downwardly sloping fingers, not shown, are provided in grooves in the lower fast roll 34 on the side away from the slow rolls 33 below the fingers 165. These two sets of fingers are more completely disclosed in my copending application Serial No. 102,986, filed July 6, 1949, entitled "Severing Mechanism." Suffice it to say that the fingers guide the sticks from the severing rollers 34 into the chute 35. Each stick, as it is coming from the fast rolls 34, is deflected downwardly into the chute, while deflecting the fingers 165 upwardly against the action of the springs 168.

The top of the stack of sticks 164 in the chute should never be so far below the space between the fast rolls 34 that a stick comes to rest edgewise in the chute. Moreover, the top of the stack should never rise above the space between the fast rolls 34. Yet there must be some appreciable difference between high and low levels of sticks in the chute in order that the photoelectric cell 161 may operate the clutch 36 in a practical way: i. e., a high level of sticks blocking the windows 163 of the chute 35 to make the detent 142 stop the control ring 138 of the clutch 36 for interrupting the transmission of driving force therethrough, and a low limit level of sticks in the chute completely unblocking the windows to raise the detent 142 from the control ring 138 for a resumption of the transmission of driving force through the clutch.

This difference in high and low gum levels equals the sum of window height for proper photoelectric cell operation plus the thickness of stick or sticks deposited in the chute after the photoelectric cell has dropped the detent 142 on the control ring 138 plus the fall of the stack in the chute after the photoelectric cell has disengaged the detent from the control ring. This difference is kept to a minimum if only one stick is added after the clutch is disengaged, i. e., by a movement of the slow rolls 33 of no more than the width of one gum stick, and if the clutch 36 is reengaged as soon as possible by movement of the block 155 into a recess 132 in the driving ring 131, i. e., through a large number of recesses 132. To prevent undue jarring in engagement of the clutch, the inclined curved region 137 is required for each recess 132, and this means keeping the overall peripheral length of each recess above a certain minimum and the recesses restricted to some number of the order of 14, as shown.

It is contemplated that the sticks 164 will be taken from the bottom of the chute 35 by some device, not shown, for a further operation such as wrapping, at a somewhat slower rate than apparatus of the present invention deposits sticks in the top of the chute. Thus in normal operation the stick level will rise across the windows 163 until the light beam is blocked, the photoelectric cell 161 will effect the dropping of the detent 142 to stop the feeding of the slab to the fast rolls 34 for severing. The level of the sticks in the chute will drop until the windows 163 are unblocked, and the photoelectric cell 161 will effect the lifting of the detent 142 to permit severing of sticks by the fast rolls to be resumed. When the cycle begins again, intermittent stopping of the feeding of the gum slabs to the conveyor and breaking rolls is part of the cycle.

Figure 2:
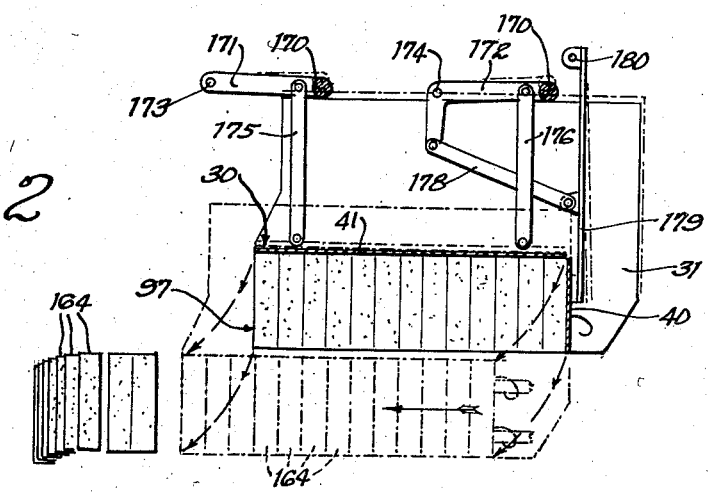
Fig. 2 is a diagrammatic plan view, partly in section, depicting the operation of a portion of my disclosed mechanism as it operates in effecting the movements of sheet or slab material from a hopper to a conveyor.

The ram plate 31 moves through one complete cycle, i. e., ejection of a slab 97 and return, during one rotation of the clutch 36 and during a movement of the pusher elements 86 a distance equal to the distance between corresponding portions of adjacent pairs of the pusher elements. As the ram plate 31 completes its return, i. e., to the position from which it moves to eject a slab of material from the hopper as depicted in Fig. 9, recesses 169 in one edge of the ram plate engage buttons 170 carried on an arm 171 and a bell crank 172, as shown in Figs. 1 and 2. The arm and bell crank are pivoted respectively at 173 and 174. Links 175 and 176 connect the arm 171 and the bell crank 172 with an upper flange 177 (Fig. 8) on the movable inclined side wall 41. A link 178 connects the bell crank 172 to an arm 179, which arm is secured to the movable inclined end wall 40 (Figs. 2 and 10) and is supported at 180 for swinging movement, as shown in Fig. 1. Thus, as the recessed portion 169 of the ram plate 31 engages the buttons 170 and moves the arms 171 and 172 as shown in Figs. 2 and 9, this movement is transmitted through the bell crank, and links described to jog the side member 41 and the end member 40 to effect lateral oscillatory movements thereof in timed relationship to the movements of the ram plate. Each cycle of jogging movement of the side and end members releases only the bottom slab 97 in the hopper 30 to the base plate 43, where such released slab is ready to be ejected by the ram 31. When the ram 31 starts its ejecting movement and the recessed portions 169 thereof move away from the buttons 170, the movable side member 41 moves back to a normal position under the action of leaf springs 180a (Fig. 8) which are secured to the hopper 30 by brackets 180b and extend through flange 177 on the side member 41. The end member 40 moves back to its normal position by the action of the same springs, because the end member 40 and side member 41 are interconnected through the bell crank 172, the links 176 and 178, and the arm 179.

The ram swings under the action of the reciprocating power driven arms 48 in an arcuate path as indicated by the full-line and dash-dot positions shown in Figs. 2 and 6 and the curved lines with arrows between the corners of the gum slab in its full-line and dash-dot positions. The movement involves components that are in the direction of movement of the pusher conveyor 32, as well as components perpendicular to such movement. As the movement of a slab from the hopper progresses, the component in the direction of movement of the pusher conveyor increases, and the perpendicular component decreases. The movement is sufficient to position the slab on the pusher conveyor and also to limit the spaces between successive slabs as they are placed on the pusher conveyor. During the last portion of the movement of the ram toward the pusher conveyor, a pair of the pusher elements 86 on the pusher conveyor move upwardly into position through recesses 181 which extend into the ram 31 from the edge 47 and engage the rear end of the gum slab to pick up the propelling movement of the slab as its movement by the ram 31 is being completed. Fig. 7 constitutes a velocity diagram in which the swinging movement of the ram is indicated. Vector 182 indicates the velocity component of the ram 31 perpendicular to the direction of movement of the pusher elements 86 at the end of the ram stroke toward the pusher conveyor, vector 183 indicates the velocity component of the ram in the direction of the pusher elements 86, and vector 184, indicates the velocity of those pusher elements. Vectors 183 and 184 preferably are practically equal in value, as depicted for the disclosed mechanism. Thus, the pusher elements 86 engage the gum slab while the slab is traveling at substantially the same speed.

It is desirable to limit the rotation of the shaft 84 to only one direction, in order to maintain the timed relationship of movements of the various parts of the mechanism, after it has been established. The rolls 33 and 34 and conveyor 32 will feed and break the gum slab as described only if the shaft 84 moves in its normal direction, but the ejector ram 31, having oscillatory movement, can be moved through the cycle required for ejecting a gum slab from the hopper 30 by rotating the shaft 84 in either direction. Rotation of that shaft in the wrong direction, however, would disturb the timed relationship of the various parts. A brake 185 having an eccentric surface portion and shown in Figs. 8 and 10, limits rotation of the shaft 84 to one direction, thereby preventing manual rotation of that shaft in the wrong direction when the mechanism is not being motor driven. The brake is mounted for relatively free rotational movement on the shaft 74 in position to engage the outer periphery of cam 83. A spring 186 connected to the brake 185 and an anchor rod or cable 187, connected to the spring and to the framework in a manner not shown, hold the large-radius region of the brake against the cam 83. Driving of the cam and its shaft 84 can take place only in a counterclockwise direction as viewed in Fig. 10, which is the normal direction of drive in the sense of being the direction required for the conveyor 32, the slow rolls 33 and the fast rolls 34 to convey the gum slabs and to break them into sticks, because movement of the cam in this direction tends to move the large-radius portion of the brake 185 out of braking engagement with the cam. Movement of the cam in the opposite direction moves the large-radius portion of the brake into wedge-like braking engagement with the cam and prevents movement of the cam and its shaft.

However, movement in the opposite direction may occur if the spring 186 or the anchor rod 187 is disconnected, and the brake is rotated sufficiently to bring a small-diameter region opposite the cam to clear it. This will be required if the ejecting ram 31 or the pushing conveyor 32 is to be backed up by hand, because jamming of a gum slab has occurred from some unusual cause. The short radial region 135 in the recess 132 in which block 155 is located permits the clutch to be operated in the direction opposite to the normal driving direction.

From the foregoing description and the accompanying drawings, it may be understood that I have developed a mechanism for receiving stacks of scored slab material and for breaking those scored slabs into sticks in a manner and at a rate to afford a continuous supply of sticks in a chute to be fed to a subsequent mechanism for an additional operation, such as wrapping. The scored slabs are placed in the hopper 30, from which they are removed sequentially and individually at the bottom of the hopper by a ram plate 31; said hopper being constructed and arranged to relieve the slab being removed and the ram plate from the major portion of the weight of the stacked slabs, as well as to effect release of a slab at the bottom of the stack each time one is removed.

The ram plate 31 delivers the slabs to an adjacent and linearly movable chain conveyor which includes pusher elements 86 for moving the slabs into engagement with slow or feeding and fast or breaker rolls. The ram plate, the movable elements for releasing slabs in the hopper, the chain conveyor and the rolls are all operated in carefully timed relationship and are subject to abrupt stopping and starting by the action of the clutch 36, in order to keep the supply of sticks in the chute 35 between selected limits. Furthermore, and in addition to aforementioned timing and features of operation, the efficiency and operation of my disclosed mechanism are improved by virtue of the fact that the ram plate travels through a cycle of motion such that the gaps between successive slabs on the pusher conveyor are minimized and the slabs are delivered to the pusher elements of the pusher conveyor while moving at substantially the same rate as the pusher elements and in the same direction.

My feeding and breaking mechanism herein disclosed maintains its timed relationship of parts even though the operation is intentionally subject to automatically effected interruptions of its continuous operation. The mechanism of my disclosed clutch 36 contributes largely to this result. It effects abrupt stops and sudden starting of the mechanism parts which are driven therethrough, and defines prescribed limits for the movements of such driven parts during the stopping and starting operations.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. Apparatus for feeding scored sheets or slabs of material, comprising a hopper for holding a stack of said slabs and having at the bottom a movable inclined side wall and a movable inclined end wall, a base below the hopper, a ram positioned between the said movable walls and the base and having the form of a plate provided with a recess defined by two edges extending along the bottoms of the inclined hopper walls in a retracted position of the ram, a pusher conveyor adjacent the hopper on the side away from the movable side wall, means for moving the ram from the said retracted position to a protruding position in which the edges of the recess lie within the angle defined by the said movable side and end walls of the hopper for advancing the lowermost slab of the stack from the hopper into the path of the pusher conveyor, and means responsive to return of the ram to its retracted position to jog the said inclined side and end walls for dropping the next bottom slab onto the base.

2. Apparatus as specified in claim 1, and wherein the pusher conveyor moves in a direction parallel to the lower edge of said movable side wall and perpendicular to the lower edge of said movable end wall.

3. Apparatus as specified in claim 1, and further comprising parallel links mounting the ram for swinging movement between its said retracted and protruding positions.

4. Apparatus as specified in claim 1, and wherein movements of the ram have components respectively increasing and decreasing in the direction of movement of the pusher conveyor and perpendicular thereto when the ram is moved from the retracted position to the protruding position.

5. In apparatus for feeding scored sheets or slabs of material, a hopper for carrying a stack of such slabs, the hopper having at the bottom a movable inclined side wall and a movable inclined end wall in adjacent relationship to one another and adapted to be jogged for releasing the bottom slab of said stack, and a ram for delivering the released bottom slab away from the bottom of the hopper by moving from a retracted position in which it extends along the edges of the said side and end walls and a protruding position in which it lies within the angle defined by the side and end walls.

6. In apparatus for feeding scored sheets or slabs of material, a hopper for carrying a stack of such slabs, the hopper having at the bottom a movable inclined side wall and a movable inclined end wall in adjacent relationship and adapted to be jogged to release the bottom slab of said stack, a ram for delivering the released slab away from the bottom of the hopper by moving from a retracted position in which it extends along the edges of the said side and end walls to a protruding position in which it lies in the angle defined by the side and end walls, and means responsive to the return of the ram to its retracted position for jogging the said side and end walls to release the next bottom slab of said stack.

References Cited in the file of this patent

UNITED STATES PATENTS

| Number | Name | Date |
|---|---|---|
| 316,329 | Brush et al. | Apr. 21, 1885 |
| 1,101,651 | Martin | June 30, 1914 |
| 1,674,319 | Cranston | June 19, 1928 |
| 1,811,344 | Baum | June 23, 1931 |
| 1,834,082 | Ballard et al. | Dec. 1, 1931 |
| 1,919,651 | Helsel | June 25, 1933 |
| 1,971,875 | Pert | Aug. 28, 1934 |
| 1,985,765 | Cornock | Dec. 25, 1934 |
| 1,987,871 | Rose | Jan. 15, 1935 |
| 2,124,397 | Gwinn et al. | July 19, 1938 |
| 2,200,276 | Hothersall et al. | May 14, 1940 |
| 2,409,341 | Borg | Oct. 15, 1946 |
| 2,427,515 | Swain | Sept. 16, 1947 |
| 2,456,699 | Hanson et al. | Dec. 21, 1948 |
| 2,492,497 | Oakley et al. | Dec. 27, 1949 |
| 2,570,198 | Brager | Oct. 9, 1951 |
| 2,576,366 | Smith | Nov. 27, 1951 |
| 2,731,131 | Shannon | Jan. 17, 1956 |